(12) United States Patent
Duquette et al.

(10) Patent No.: US 7,945,508 B2
(45) Date of Patent: *May 17, 2011

(54) SYSTEM AND METHOD FOR PRIORITIZED DATA DELIVERY IN AN ELECTRONIC TRADING ENVIRONMENT

(75) Inventors: Douglas R. Duquette, Wilmette, IL (US); Robert A. West, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/781,491

(22) Filed: May 17, 2010

(65) Prior Publication Data

US 2010/0228833 A1 Sep. 9, 2010

Related U.S. Application Data

(63) Continuation of application No. 11/551,567, filed on Oct. 20, 2006, now Pat. No. 7,747,513.

(51) Int. Cl.
*G06Q 40/00* (2006.01)
(52) U.S. Cl. .......................................... 705/37; 709/207
(58) Field of Classification Search ...................... 705/37
See application file for complete search history.

(56) References Cited

U.S. PATENT DOCUMENTS

| | | | |
|---|---|---|---|
| 5,073,180 A | 12/1991 | Farooq et al. | |
| 6,073,180 A * | 6/2000 | Onoda et al. | 709/234 |
| 6,732,185 B1 * | 5/2004 | Reistad | 709/238 |
| 7,120,113 B1 * | 10/2006 | Zhang et al. | 370/229 |
| 2001/0049651 A1 * | 12/2001 | Selleck | 705/37 |
| 2005/0047425 A1 * | 3/2005 | Liu et al. | 370/411 |
| 2005/0172024 A1 * | 8/2005 | Cheifot et al. | 709/225 |
| 2006/0259399 A1 * | 11/2006 | Mintz et al. | 705/37 |
| 2007/0038549 A1 * | 2/2007 | Janowski et al. | 705/37 |
| 2007/0198397 A1 * | 8/2007 | McGinley et al. | 705/37 |

OTHER PUBLICATIONS

International Search Report for International Application No. PCT/US07/81749 mailed Nov. 21, 2008.

* cited by examiner

*Primary Examiner* — Jagdish N Patel
*Assistant Examiner* — Kevin Poe
(74) *Attorney, Agent, or Firm* — McDonnell Boehnen Hulbert & Berghoff, LLP.

(57) ABSTRACT

A system and method for prioritized data delivery in an electronic trading environment are described herein. According to one example embodiment, by prioritizing the messages associated with a tradeable object, the bandwidth and system resource usage may be optimally reduced, and any loss of priority content in the messages sent between the network device and the client device may be reduced. An example method includes associating different priority levels with messages comprising market data. Messages containing market information related to the inside market may be associated to a higher priority level. Whereas messages containing market information relating to the quantities at prices outside the inside market may be associated with a lower priority level. Based on the priority level associated with a message, a network device may send the message directly to the client device or store the message in a data structure until a predefined condition is satisfied.

22 Claims, 3 Drawing Sheets

SYSTEM AND METHOD FOR PRIORITIZED DATA DELIVERY IN AN ELECTRONIC TRADING ENVIRONMENT

CROSS REFERENCE TO RELATED APPLICATION

This application is a continuation of U.S. patent application Ser. No. 11/551,567, filed Oct. 20, 2006, entitled "System and Method for Prioritized Data Delivery in an Electronic Trading Environment," which issued as U.S. Pat. No. 7,747,513 on Jun. 29, 2010, the contents of which are fully incorporated herein by reference.

FIELD OF INVENTION

The present invention is directed towards electronic trading. Specifically, the present invention is directed towards prioritized data delivery in an electronic trading environment.

BACKGROUND

At one time, there were only open-outcry exchanges where traders, specifically buyers and sellers, would come together to trade in person. With the advent of electronic trading, traders can participate at their client devices from remote distances by communicating over physical networks with electronic exchanges that automatically match bids and offers.

In particular, subscribing traders are connected to an exchange's electronic trading platform by way of a communication link and through an application program interface to facilitate real-time electronic messaging between themselves and the exchange. The electronic trading platform includes at least one electronic market, which is at the center of the trading system and handles the matching of bids and offers placed by the traders for that market. The electronic messaging includes market information that is distributed from the electronic market to the traders via an electronic data feed. Once the traders receive the market information, it may be displayed to them on their trading screens. Upon viewing the information, traders can take certain actions including the actions of sending buy or sell orders to the electronic market, adjusting existing orders, deleting orders, or otherwise managing orders. Traders may also use software tools on their client devices to automate these and additional actions.

Although the amount or type of market information published by an electronic exchange often differs from exchange to exchange or from market to market, there are generally some standard pieces of information. Market information may include data that represents just the inside market. The inside market is the lowest available offer price (best ask) and the highest available bid price (best bid) in the market for a particular tradeable object at a particular point in time. Market information may also include market depth. Market depth refers to quantities available at the inside market and may also refer to quantities available at other prices away from the inside market. The quantity available at a given price level is usually provided by the exchange in aggregate sums. In other words, an exchange usually provides the total buy quantity and the total sell quantity available in the market at a particular price level in its data feed. In addition to providing order book information such as price and quantity information, electronic exchanges can offer other types of market information such as the open price, settlement price, net change, volume, last traded price, the last traded quantity, and order fill information.

The extent of the market depth available to a trader usually depends on the exchange. For instance, some exchanges provide market depth for all (or most) price levels, and others may provide no market depth at all. Electronic exchanges often limit the market depth offered as market information can become intensive for network and client devices. For instance, an electronic market might offer only "5" levels of market depth, which includes the quantities available at the current top "5" buy prices and the quantities available at the current top "5" sell prices.

Regardless of whether an electronic exchange limits the enormous amount of messages being broadcast, very often the intermediary and client devices may have to handle the burden and consequently can be overwhelmed. At times, the intermediary and client devices may be unable to handle the massive processing load and, at least during those times, they cannot maintain near real-time data processing. Additionally, as more traders begin trading in electronic trading environment, the load on the intermediary and client devices is likely to continue growing at an increased rate.

Electronic exchanges and/or distributors of market information often struggle to balance the message processing load and the timeliness of market information messages with the limitations of physical networks to deliver a network friendly, data intensive, fast response market information feed. Most often, traders want access to as much of this information as fast as possible so that they can make more efficient and more effective trades. However, due to the trader's demands for near real-time market information updates, many client devices have suffered from delays in market information updates and on occasion the loss of content in the market information updates that are received.

Despite the attempts made by electronic exchanges and others to improve the distribution of market information, by for example, limiting the market depth, there are still many disadvantages to the current methods of distribution, or at the very least the current solutions are incomplete.

It is therefore, beneficial to provide a trading system that offers a more dynamic method for distributing market information that will provide the traders with their desired market information as quickly as possible.

SUMMARY

The example embodiments are directed to a system and method for prioritized data delivery in an electronic trading environment. By prioritizing the messages associated with a tradeable object, the computer and network resources may be optimally utilized, and the possibility of any loss of priority content between the network and client device may be reduced. The system and method are premised on a concept that certain pieces of market data are more important to traders than others. For example, a trader might base most of his or her decisions on changes of the inside market, while placing less emphasis on what is occurring at prices outside of the inside market. In another example, a trader might place more emphasis on last trades or some other item of interest. The system and method builds on this premise to provide an efficient mechanism for data distribution in a way that does not significantly inhibit the delivery of important pieces of market data to the trader. Thus, the system and method provides that the trader gets the information that is most important to him or her, while at the same time reduces the burden on intermediary and client side devices.

To facilitate prioritized data delivery according to one example method described herein, the system includes associating a lower priority level with a message comprising market data related to quantities at prices outside of the inside market and associating a higher priority level with a message comprising market information related to the inside market or trade related information. A network device, or some other intermediary device, may store any low priority market data in a data structure. The system will then coalesce the low priority data in an effort to reduce the necessary amount of data that is to be sent to the client. If and when a higher priority message is received, the coalesced, lower priority market data and the higher priority market data will be sent directly (or as soon as possible) to the client device. Sending the high and low priority market data together provides that the client will have the most up to date data and accurate representation of the current market.

Receiving a high priority message is an example of a triggering event, or pre-defined condition, which triggers the low priority market data and the high priority market data to be sent to the client device together. Other pre-defined conditions may also be programmed in addition to, or in place of, the receipt of a high priority message. For instance, a pre-defined condition might also include a time period, a calculation, or some other user-defined process that determines when to send messages to the client device.

The system and method facilitate prioritized data delivery in a way that benefits the trader and reduces the overall burden on system and network resources. While some illustrations have been provided above, additional examples are provided herein. Modifications may also be made to the system and method without departing from the spirit or scope of the invention. Additional features and advantages of the example embodiments will be set forth in the description that follows. The features and advantages of the example embodiment may be realized and obtained through the embodiments particularly pointed out in the appended claims. These and other features will become more fully apparent from the following description and appended claims, or may be learned by the practice of the example embodiments as set forth hereinafter.

BRIEF DESCRIPTION OF DRAWINGS

Example embodiments are described herein with reference to the following drawings, in which.

DETAILED DESCRIPTION

I. Overview

Figure 1:
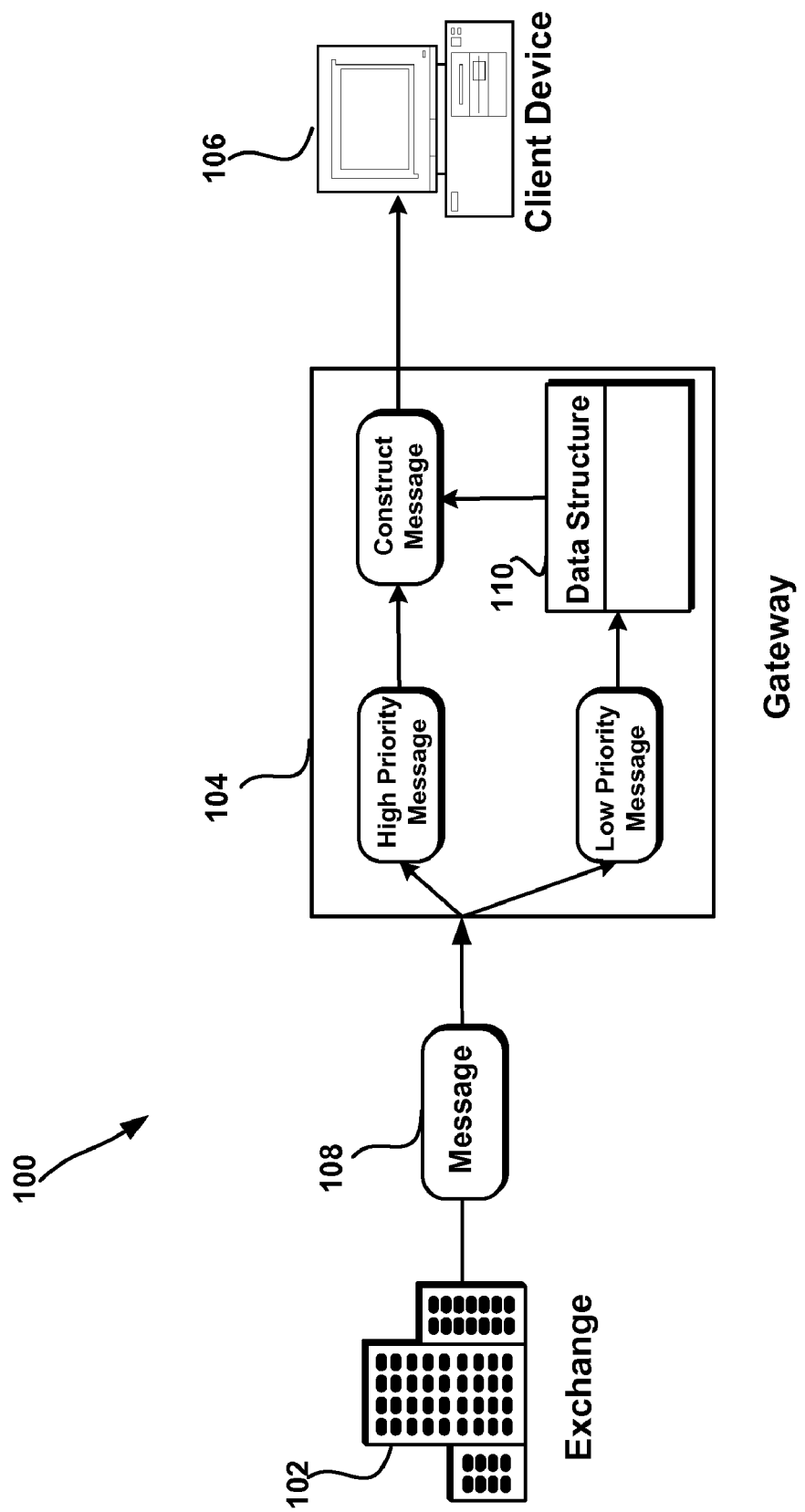
FIG. 1 is a block diagram illustrating an example system that provides prioritized data delivery in an electronic trading environment.

A system and method for prioritized data delivery in an electronic trading environment are provided. The messages described herein include market information related to one or more tradeable objects that are traded at an electronic exchange. The example embodiments are particularly useful when the market is fluctuating rapidly and massive amounts of market updates, in the form of messages, are being sent from the electronic exchange. Although the example embodiments may be useful at other times during the course of a trading day to optimally utilize the network and system resources. According to the example embodiments, optimal utilization of system resources is provided by giving messages of less significance to a trader a lower priority of delivery to the client device. Messages that relate to the inside market or contain trade related market information, such as last traded price and last traded quantity, are generally of the utmost importance to a trader and may be considered a higher priority. Those high priority messages may be ushered through the system with a higher priority than messages that relate to quantities at prices outside of the inside market.

While the example embodiments are directed towards operation at an intermediary device, such as a gateway that is positioned between an electronic exchange and the client device, it should also be understood that the prioritization of messages may very well take place at the electronic exchange, such that the messages sent from the exchange to the intermediary device are already prioritized.

Associating a priority level with a message can be based on many different pre-set criteria, which can be configured by the programmer of the system or even the trader himself or herself, if so desired. For example, as will be discussed further below, traders generally base the placement of their orders on the inside market prices, movements, and quantities at the inside market prices. As the inside market generally represents the most precise current state of the market, it is beneficial that the inside market is displayed or processed by the trading system as quickly and as accurately as possible, with a latency as close to zero as possible. Latency is defined herein as the time it takes for a message to move across a network connection from the message origin to the message destination. The priority level associated with a message may determine whether and how quickly the message will be relayed to the client device.

A trader might also define a range of price levels around the inside market that the trader is most interested in. When a message is received that includes market information relating to a market change within the specified range of price levels, then that message may also be associated with the higher priority level. It should be understood that multiple levels of priority can be defined by the trader using any number of pre-set criteria.

Trade related information such as last traded price and last traded quantity, may be as important or more important to a particular trader, and therefore, the trade related information can be included with (or substituted with) the inside market when the "inside market" is referred to herein. If another item of interest is deemed important to a certain trader, then it is preferable that the system can be configured to give that item of interest a higher priority (so any item of interest may be substituted for the "inside market" as used herein).

Oftentimes, the data relating to quantities at prices outside of the inside market are not as high of a priority to the trader as the inside market data. The amount of time a trader spends analyzing quantities at prices outside of the inside market, may in some instances, be considered minimal by comparison. Therefore, data relating to the quantities at prices outside of the inside market are not subject to immediate matching or market changes and are generally considered to be not as important and may not be immediately sent, depending on the conditions, to the client device. According to one example embodiment, messages containing such market data may be buffered and then stored in a data structure until a pre-defined condition is satisfied. Messages of the lower priority may be coalesced, or overwritten, by more recent lower priority information. Coalescing is defined herein as consolidating multiple market information updates with other related market information updates to create a single update.

As previously stated, the pre-defined condition might be a time period, the receipt of a higher priority message at the intermediary device, a calculation, or some other user-defined process used to determine when to send messages to the client device.

While the example embodiments are described herein with reference to illustrative embodiments for particular applications, it should be understood that the example embodiments are not limited thereto. Other systems, methods, and advantages of the present invention will be or become apparent to one with skill in the art upon examination of the following drawings and description, such as giving another item of interest a higher priority. As previously stated, it is intended that all such additional systems, methods, features, and advantages be within the scope of the present invention, and be protected by the accompanying claims.

II. Hardware and Software Overview

According to the example embodiments, the communication between an electronic exchange and a client device involves an exchange broadcasting messages to a connecting network device such as a gateway or router (or some other intermediary device, collectively referred to herein as a "gateway"), and the network device then relaying the market data of that message to the client device. Software and hardware components or a combination thereof, at the gateway can implement the example embodiments described herein.

For example, assume the gateway has received a message containing market information from an electronic exchange. At a time of high message traffic, the gateway determines, based on the pre-set criteria, the priority level of the message. If the message is of the lower priority level, the gateway will store the market data from the message in a data structure, where the most recent lower priority market data will be stored and coalesced with any previously stored lower priority market data, until a pre-defined condition is satisfied. An example list of pre-defined conditions were described above. According to one example pre-defined condition (i.e., receipt of a high priority message), if a higher priority level message then arrives at the gateway, it will send the data of both the previously stored lower and the current higher priority messages together to the client device. If a higher priority message arrives at the gateway first and there is no lower priority message data stored in the data structure, the higher priority message data will immediately be sent to the client device by itself.

Turning now to FIG. 1, which shows a block diagram illustrating an example system utilized for prioritized data delivery in an electronic trading environment. Specifically, FIG. 1 includes an electronic exchange 102, a gateway 104, a client device 106, a message 108, and a data structure 110. Electronic exchange 102 may host one or more computer-based electronic markets. Traders may connect to the one or more electronic markets to trade tradeable objects. Gateway 104 is a network device and includes one or more computers (or programs) running software that receives and transmits market information to and from exchange 102 in the form of messages which may include price, order, and fill information. Client device 106 is a computer that receives one or more messages from gateway 104. Also included in FIG. 1 is illustrative message 108. Message 108 contains market information relating to a tradeable object. Message 108 may include current inside market information, trade related information, or even market information relating to the current price levels outside the current inside market. Determining the actual contents of message 108 may be performed at gateway 104. Data structure 110 temporarily stores messages that are determined to be of a lower priority, more of which is described below.

A. Exchange

Exchange 102 broadcasts many different types of market information messages for connecting gateways, traders, brokers, etc. to receive. Gateway 104 connects to the exchange 102 to receive the broadcast market information messages, which gateway 104 may then relay to client device 106. It should be understood that a message from one exchange may contain market information representing a different tradeable object than a message from a second exchange. As used herein, the term "tradeable object" refers to anything that can be traded with a quantity and a price. For example, tradeable objects may include, but are not limited to, all types of traded financial products, such as, for example, stocks, options, bonds, futures, currency, and warrants, as well as funds, derivatives, and collections of the foregoing. Moreover, tradeable objects may include all types of commodities, such as grains, energy, and metals. Also, a tradeable object may be "real," such as products that are listed by an exchange for trading, or "synthetic," such as a combination of real products that is created by the trader (e.g. spread). A tradeable object could also be a combination of other tradeable objects, such as a class of tradeable objects or a trading strategy.

In general, a message from exchange 102 may include market information representing prices and quantities for a tradeable object. For example, the message could represent market information related to the inside market, such as the highest bid or the lowest ask, or market information relating to prices outside the inside market. It should be understood that the messages received from the electronic exchange may include other data and should not be limited to the examples referenced above.

The electronic exchange may also broadcast separate messages containing trade related market information, for example, market information relating to trade matches. A trade match is defined herein as an electronic trading system matching a trader willing to buy a tradeable object for a price to another trader offering to sell the same tradeable object at the same or better price, resulting in a trade match.

A trade match message sent to a specific trader may include private order information such as last traded price and last traded quantity as well as order number, account number, transaction code, price, time, quantity and tradeable object. Such a private order message is not broadcast to all connected devices, as the electronic exchanges strive for order anonymity between traders. The exchange also broadcasts messages to generally let all traders know that matches have occurred at certain price levels, without revealing any specific information, such as who the order was placed by. Trade match message broadcast to all traders may contain only public and anonymous order information, such as last traded price and last traded quantity. A trade related message is the primary public source for all traders to know what quantities and prices have been matched in the market. Messages related to trade information may also be associated with the higher priority level and sent to the client device as quickly as possible.

One of ordinary skill will appreciate that any message or message type provided by an exchange can be utilized by the example embodiments and one could configure the system to work with those messages or message types appropriately.

B. Gateway

As mentioned earlier, gateway 104 includes one or more computers (or programs) running software that receives and transmits market information to and from the exchange 102. As used herein, a computer includes any device with memory and a processor capable of processing information to produce a desired result. Thus, a gateway can be a computer of any size such as a network server, workstation, personal computer, or laptop, but generally, the gateway is any computer device that has the processing capability to perform the function described herein.

According to the example embodiment, electronic exchange 102 broadcasts messages containing market information and the connected gateway 104 receives the messages. Gateway 104 then sends the message data to client device 106. However, instead of sending each message data to client device 106 as it is received, gateway 104 may optimally utilize the network and system resources by prioritizing data delivery to client device 106.

Data structure 110 is used to store the data of lower priority. Generally, data structures are used to store related market data such that it can be accessed and used efficiently. There are a variety of data structures known in the art; however, the described example embodiments should not be limited to one specific type of data structure. It should also be understood that the data structure can be located at the exchange or at the gateway or be in communication with either or both.

Based on the pre-set criteria for determining the priority level of a message, gateway 104 associates a priority level with each message as it is received. According to an example embodiment, gateway 104 determines the priority level of message 108 by examining the message header. Within the header portion of the message is a differentiating message type. Each message sent from an electronic exchange contains a message type. It should be understood, that message types may not be consistent from one exchange to another, so it is beneficial for a gateway to have knowledge of the different possible types of messages. When a message is received at gateway 104, a simple determination of message type is made by comparing the header to the already known message types. Based on the message type of message 108, gateway 104 prioritizes the message, such that if the message includes higher priority market information the message may be a "Higher Priority Message" and may be sent to the client device without any delay. Alternatively, if the message is a "Lower Priority Message" containing lower priority market information, the market information from the message will be stored in data structure 110 until a pre-defined condition is satisfied. Once the pre-defined condition is satisfied, gateway 104 will "Construct a Message" to send to client device 106.

C. Client Device

As mentioned earlier, client device 106 is a computer that allows a trader to participate in the market at exchange 102. In general, it can use software that creates specialized interactive trading screens on the client device's terminal. The trading screens enable traders to enter and execute orders, obtain market quotes, and monitor positions. The range and quality of features available to the trader on a trading screen varies according to the specific software application running, for example, black box trading software or strategy trading software.

II. Example System and Function Overview

Figure 2:
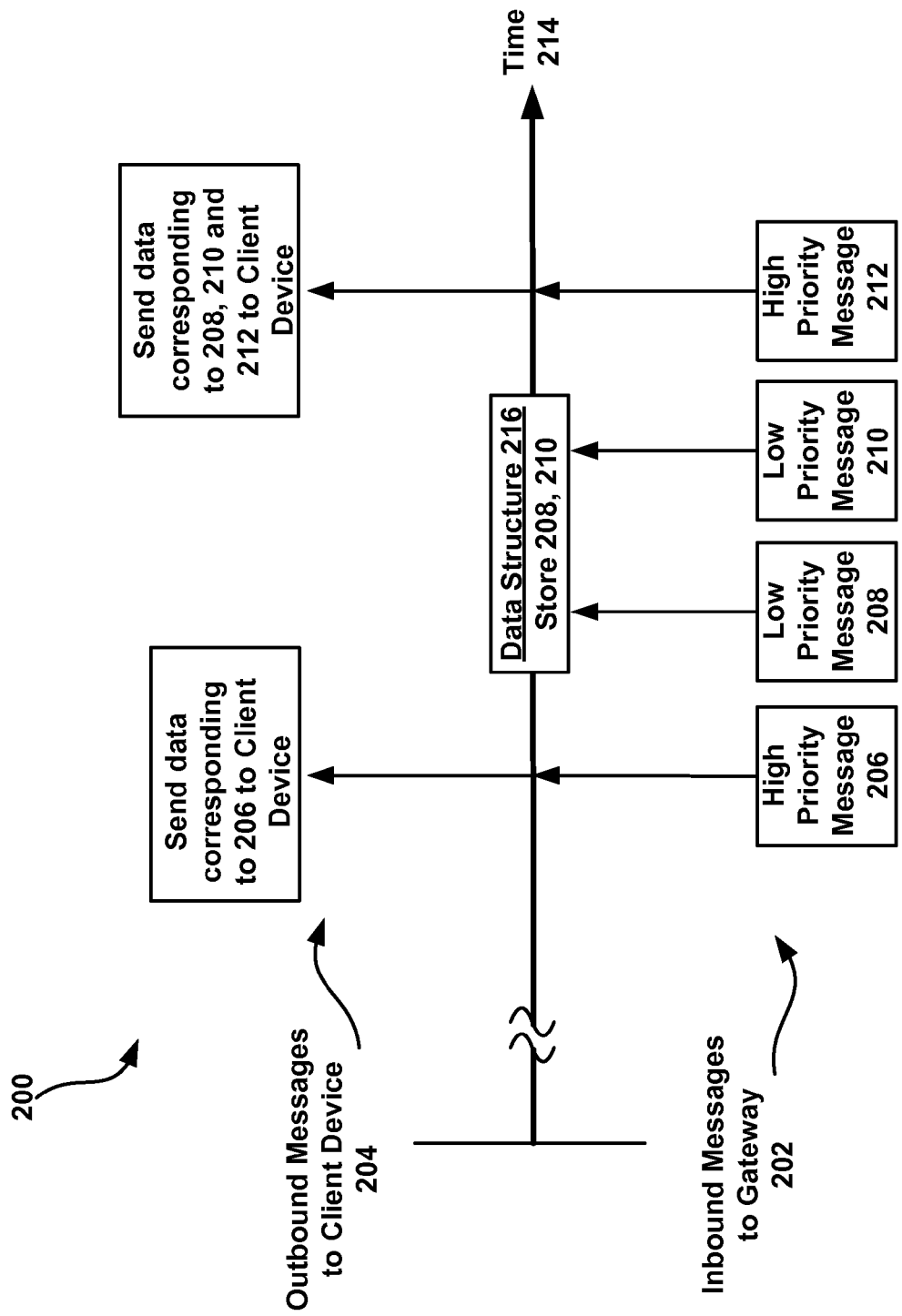
FIG. 2 is a timeline illustrating messages flowing through the example system shown in FIG. 1.

FIG. 2 is a timeline illustrating messages arriving at the gateway from the electronic exchange and then being forwarded onto the client device. Specifically, FIG. 2 includes inbound messages to the gateway 202, outbound messages to the client device 204, high priority level messages 206 and 212, lower priority messages 208 and 210, timeline 214, and data structure 216. According to the example embodiments, when gateway 104, shown in FIG. 1, determines that the received message is of the higher priority level, the data is sent to the client device. Otherwise, according to an example embodiment the message is stored, at least temporarily, at data structure 216. Directly below are some examples.

In FIG. 2, message 206 is received at the gateway and the gateway determines the contents of message 206 and ultimately determines a priority level to associate with message 206. The gateway may determine the priority level by examining the contents of the message header and determining if the message contains inside market information. The gateway determines that message 206 contains data related to the inside market, therefore the gateway associates a higher priority level with message 206. Once this determination is made, data from message 206 is buffered, and then sent to the client device without being stored in the data structure 216. When the client device receives the higher priority data of message 206, the software at the client device may process that data for the trader to utilize as quickly as possible.

A buffer is a temporary storage area, usually in Random Access Memory (RAM), used for the purpose of acting as a holding area which enables the CPU to manipulate the data before it is transferred to the next device. It should be understood that buffering the message preferably occurs at such a rapid rate that the message is ultimately sent to the client device in near real-time, however, the system could be configured to include a time delay if the trader desired. It should also be understood that the example embodiments are not limited to a system that requires buffering.

Message 208 is received at the gateway following message 206. Based on the message header contained in message 208, the gateway determines that message 208 contains information relating to quantities at prices outside of the inside market and therefore considers message 208 to be of the lower priority level. As shown in FIG. 2, the gateway stores the lower priority data of message 208 in data structure 216 until a pre-defined condition is satisfied.

Similarly, message 210 is received at the gateway. Based on the message header contained in message 210, the gateway determines that message 210 also contains information relating to quantities at prices outside of the inside market and therefore considers message 210 to also be of the lower priority level. As shown in FIG. 2, the gateway stores the lower priority data of message 210 in data structure 216 with message 208 until a pre-defined condition is satisfied. It should be understood that the lower priority data of messages 208 and 210 may be coalesced together to create one single message in data structure 216.

For example, a pre-defined condition could be defined to send any stored data from a lower priority level message along with a higher priority message if and when at a later time, a higher priority level message is received from the electronic exchange. Higher priority level messages might include messages related to the inside market, market changes within a range of price levels from the inside market, trades, or any other item of interest.

In another example, a pre-defined condition may be a time period defined by a trader or by the electronic trading system, such that any coalesced lower priority message data may be sent to the client device as soon as the user-defined time period expires.

According to another example, a pre-defined condition may be based on an event, such as the receipt of a lower priority message once the pre-defined time period has expired. For example, once the pre-defined time period expires, any coalesced lower priority message data would be sent to the client device with the next received message (low or high priority).

According to yet another example, a pre-defined condition may be based on an event, such as when the processor has been inactive for a specified time period and there is coalesced lower priority data stored in the data structure waiting to be sent to the client device. Specifically, if there is any lower priority market data stored in the data structure after a period of inactivity in the processor, then the gateway will send that lower priority message data to the client device. For example, the inside market may, in some instances, jump dramatically and have a series of fast market updates, however, this burst in the market may be very brief. The market jump may be followed by a period of inactivity. In the previously described examples, the lower priority market information received during the burst in the market may be stored in the data structure until the time period expires or until the next message is received. However, the market information received during the market burst is extremely important to the trader and waiting for either the time period to expire or the receipt of another message may cause the market information at the client device to be inaccurate and delayed. It is therefore beneficial to send any lower priority market information as soon as the processor determines that a period of inactivity has occurred and that there is coalesced lower priority data to be sent.

In another example, such as in the case of when the market has closed, waiting for the next received message, as described above, might mean that the gateway is waiting to send stored coalesced lower priority data for an extended period of time, possibly even until the next trading day. Again, the processor may recognize a period of inactivity, and send any lower priority data stored in the data structure instead of waiting for the pre-defined time period to expire or for another message to arrive.

Additionally, the pre-defined condition may be a combination of any of the previously discussed pre-defined conditions, for instance a defined time period may be used in conjunction with the receipt of a higher priority message.

In another example, message delivery based on the example provided above may be modified upon a determination by the gateway that the market is fast or slow. A gateway may determine if a market is fast or slow by monitoring how many messages are received within a user-defined time period. If the market is slow, instead of using pre-defined conditions as the basis for delivery of messages to the client device, the gateway may bypass the rules for prioritizing messages as described above and send all of the received messages to the client device without storing them in the data structure or considering priority levels for the received messages. With respect to a fast market, e.g. a market with many updates, the gateway may use any of the previously discussed pre-defined conditions or may choose to only send the higher priority messages to the client device so as to reduce the bandwidth usage. In this example, a fast market can be determined by also monitoring the number of messages received within a user-defined time period. If the amount of messages received during the user-defined time period is greater than a pre-defined number, then the market is considered fast. In this situation, the lower priority messages may for example, be stored in the data structure but not sent to the client device until the state of the market has changed.

Based on the pre-defined condition, the gateway may determine which messages of the lower priority level should be sent and when they should be sent the client device, resulting in optimal utilization of the network bandwidth and system resources between the gateway and the client device. It may also significantly reduce processing load at the client device. It should be understood that although the example embodiments reference one client device, that multiple client devices could be used and generally referred to as the client side.

According to an example embodiment, assume that the pre-defined condition has been defined to send any coalesced lower priority message data that is stored in data structure 216 to the client device along with any higher priority message data that is received at the gateway. Message 212 then arrives at the gateway and contains data relating to the inside market, therefore message 212 is associated with the higher priority level. When message 212 arrives at the gateway, the data of message 212 will be sent directly to the client device along with any coalesced lower priority message data being stored in data structure 216. When message 212, a higher priority level message, arrives at the gateway, the pre-defined condition is considered satisfied by the gateway. Once message 212 is received, the coalesced data of messages 208 and 210 are retrieved from data structure 216, and the coalesced data of messages 208 and 210, and the data of message 212 are sent to the client device at the same time. It should be understood that if an additional lower priority message was stored in data structure 216 with messages 208 and 210, the messages may be coalesced together to create a single message. For example, if a lower priority message arrived at the gateway containing the market information "Quantity 100 at Price 100", the message would be stored in the data structure. However, if another lower priority message arrived containing the market information "Quantity 50 at Price 100", then the two messages may be coalesced and the previous quantity of "100" would be overwritten by the more updated quantity of "50." It is advantageous to utilize coalescing as a method to reduce the overall amount of messages sent to the client device.

As previously stated, a trader may define a range of price levels around the inside market to be used in determining the priority level of the message. The range of price levels may be user-configurable and may define price levels the trader is most interested in. For example, a range of price levels of "2" would define "2" price levels above the lowest available offer price, the inside market, and the "2" price levels below the highest available bid price. When a message is received at gateway 104 that includes market information relating to a change within the "2" price levels above or below the inside market, then the gateway may associate the higher priority level with the message data and send it to the client device as quickly as possible. It should be understood that a trader could define multiple ranges of price levels, each being associated with a different priority level. For example, the pre-set criteria for the higher priority level may be prices within "2" price levels of the inside market. The next priority level may be prices within the next "3" price levels, etc.

Figure 3:
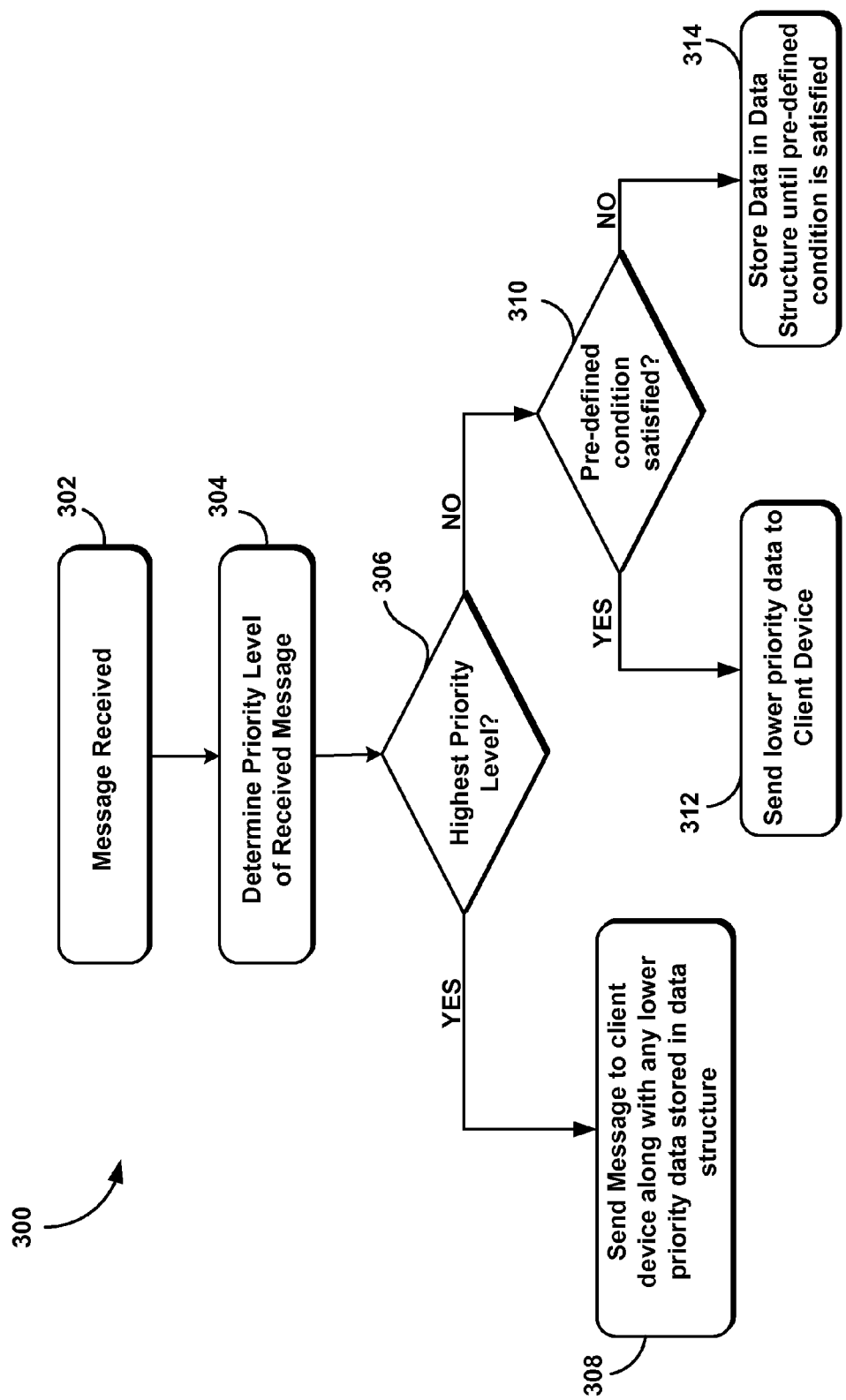
FIG. 3 is a flow chart illustrating an example method for prioritized data delivery in an electronic trading environment.

FIG. 3 is a flow chart illustrating an example method for prioritized data delivery in an electronic trading environment. It should be understood that the flow chart only shows the functionality and operation of a possible implementation of the present embodiments. In this regard, each block may represent a module, a segment, or a portion of the program code, which includes one or more executable instructions for implementing specific logical functions or steps in the process. Alternative implementations are included within the scope of the example embodiments of the present invention in which functions may be executed out of order from that shown or discussed, including substantially concurrent or in reverse order, depending on the functionality involved, as would be understood by those reasonably skilled in the art of the present invention.

At step 302, a message is received at the gateway (or another intermediary device) from the electronic exchange. The message contains market information related to a tradeable object.

At step 304, the gateway determines what market information is contained in the message by examining the message header (or some other part of the message). Based on the pre-set criteria, the data of the message is associated with a priority level.

At step 306, the gateway determines if the message data is of the higher priority level. According to an example embodiment described above, if the message contains market information relating to the inside market or trade related information such as the last traded price or quantity, the message data is considered to be of the higher priority level. Otherwise, the message data is considered to be of the lower priority level and is stored in the data structure until a pre-defined condition is satisfied.

If the message data is of a higher priority, the gateway determines if there is any other lower priority information stored in the data structure, and if there is the gateway will send both the higher priority and lower priority market information to the client device at step 308. If the data structure does not contain any lower priority market information, the higher priority market information will be sent to the client device by itself. Once the market information is received at the client device, the market information may be processed and utilized by the trader for use in trading and analyzing the current market.

If the message data is of the lower priority level, the gateway determines if the pre-defined condition has been satisfied at step 310. According to the example embodiment, if the pre-defined condition has been satisfied, the gateway will send the lower priority information stored in the data structure to the client device at step 312. If the pre-defined condition has not been satisfied, the gateway stores and coalesces the data of the lower priority message in a data structure at step 314 until a pre-defined condition is satisfied. As previously described, the pre-defined condition can range from a time based condition, a market based condition, the receipt of a specified type of message, or some other user-defined process used to determine when to send messages to the client device. It should be understood that a lower priority message may never get delivered to the client if the lower priority message data was coalesced with other lower priority message data, for example.

Conclusion

The example embodiments discussed above describe a system and method for prioritized data delivery in an electronic trading environment. By prioritizing the messages associated with a tradeable object, the system and network resource usage may be optimally utilized. The method includes, for example, associating a higher priority level with a message comprising market information related to the inside market and associating a lower priority level with a message comprising market data related to the quantities at prices outside the inside market. Based on the priority level associated with a message, the message data may be stored in a data structure until a pre-defined condition is satisfied, or sent directly to the client device, such that there is not as much message data being sent to the client device and the bandwidth and system resource usage are optimally reduced.

The above description of the example embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for dynamically determining quantity for risk management may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method for prioritized data delivery to a client in an electronic trading environment, comprising:
   receiving at an intermediary device a first message associated with a tradeable object;
   determining at the intermediary device that the first message comprises data associated with a low priority level;
   storing the data from the first message in a data structure, wherein the intermediary device is in communication with the data structure;
   determining at the intermediary device if a second message comprising data associated with a high priority level is received during a time period after the first message is received;
   when the time period expires and the second message was not received at the intermediary device during the time period, sending from the intermediary device the data associated with the low priority level to the client; and
   when the second message is received during the time period at the intermediary device, sending to the client from the intermediary device the data associated with the high priority level together with the data associated with the low priority level upon receiving the second message.

2. The method of claim 1, wherein the second message is associated with the high priority level based on a type of message associated with the second message.

3. The method of claim 2, wherein the type of message associated with the high priority level is user-defined.

4. The method of claim 1, wherein the second message comprises an inside market data, wherein the inside market data comprises a highest bid price and a lowest ask price.

5. The method of claim 1, wherein the second message comprises trade related data.

6. The method of claim 5, wherein the trade related data comprises a last traded price.

7. The method of claim 5, wherein the trade related data comprises a last traded quantity.

8. The method of claim 1, wherein a period of market inactivity is detected when the first message is received.

9. The method of claim 1, further comprising:
   receiving a third message prior to receiving the second message, wherein the third message comprises data associated with the low priority level; and
   storing the data associated with the third message in the data structure.

10. The method of claim 9, further comprising:
    coalescing at the intermediary device the data associated with the first message and the data associated with the third message to generate coalesced market data; and
    wherein sending to the client the data associated with the high priority level together with the data associated with the low priority level upon receiving the second message comprises sending the coalesced market data together with the data associated with the second message.

11. The method of claim 1, wherein the intermediary device is located at an electronic exchange.

12. The method of claim 1, wherein the intermediary device is a gateway.

13. The method of claim 1, wherein the intermediary device is not located at an electronic exchange.

14. The method of claim 1, wherein the client comprises a client network side device.

15. The method of claim 1, wherein the client comprises a computer.

16. A non-transitory computer readable medium having stored therein instructions to execute a method for prioritized data delivery to a client in an electronic trading environment, comprising:
   receiving a first message associated with a tradeable object;
   determining that the first message comprises data associated with a low priority level;
   storing the data from the first message in a data structure;
   determining if a second message comprising data associated with a high priority level is received during a time period after the first message is received;
   when the time period expires and the second message was not received during the time period, sending the data associated with the low priority level to the client; and
   when the second message is received during the time period, sending to the client the data associated with the high priority level together with the data associated with the low priority level upon receiving the second message.

17. The computer readable medium of claim 16, wherein the second message is associated with the high priority level based on a type of message associated with the second message.

18. The computer readable medium of claim 17, wherein the type of message associated with the high priority level is user-defined.

19. The computer readable medium of claim 16, wherein the second message comprises an inside market data, wherein the inside market data comprises a highest bid price and a lowest ask price.

20. The computer readable medium of claim 16, wherein the second message comprises trade related data.

21. The computer readable medium of claim 16, wherein the method further comprises:
   receiving a third message prior to receiving the second message, wherein the third message comprises data associated with the low priority level; and
   storing the data associated with the third message in the data structure.

22. The computer readable medium of claim 21, wherein the method further comprises:
   coalescing the data associated with the first message and the data associated with the third message to generate coalesced market data; and
   wherein sending to the client the data associated with the high priority level together with the data associated with the low priority level upon receiving the second message comprises sending the coalesced market data together with the data associated with the second message.

* * * * *